US008504480B2

(12) United States Patent
Piersol

(10) Patent No.: US 8,504,480 B2
(45) Date of Patent: Aug. 6, 2013

(54) CREATION OF SIGNATURES FOR AUTHENTICATING APPLICATIONS

(75) Inventor: Kurt W. Piersol, Campbell, CA (US)

(73) Assignee: Ricoh Co., Ltd, Tokyo (JP)

( * ) Notice: Subject to any disclaimer, the term of this patent is extended or adjusted under 35 U.S.C. 154(b) by 66 days.

(21) Appl. No.: 13/020,643

(22) Filed: Feb. 3, 2011

(65) Prior Publication Data

US 2012/0203670 A1 Aug. 9, 2012

(51) Int. Cl.
*G06F 21/00* (2013.01)
(52) U.S. Cl.
USPC ........... 705/50; 726/26; 705/51; 705/59; 705/52; 705/53; 705/54; 705/55; 705/56; 705/57; 705/58; 707/687; 707/698
(58) Field of Classification Search
USPC ........................................ 795/50–59
See application file for complete search history.

(56) References Cited

U.S. PATENT DOCUMENTS

| | | | | |
|---|---|---|---|---|
| 5,892,900 | A * | 4/1999 | Ginter et al. | 726/26 |
| 6,601,172 | B1 | 7/2003 | Epstein | |
| 7,587,368 | B2 * | 9/2009 | Felsher | 705/65 |
| 2004/0107348 | A1 | 6/2004 | Iwamura | |
| 2008/0243688 | A1 | 10/2008 | Hart | |

FOREIGN PATENT DOCUMENTS

| | | |
|---|---|---|
| JP | 2004-180278 | 6/2004 |
| JP | 2004-0272531 | 9/2004 |
| JP | 2008-269591 | 11/2008 |
| WO | WO-99/35785 | 7/1999 |

OTHER PUBLICATIONS

International Search Report and Written Opinion for PCT/JP2012/052435; dated Apr. 24, 2012; 11 pages.

* cited by examiner

*Primary Examiner* — Calvin Loyd Hewitt, II
*Assistant Examiner* — Cristina Owen Sherr
(74) *Attorney, Agent, or Firm* — Patent Law Works LLP

(57) ABSTRACT

A method and system for authenticating applications. The system includes a plurality of portable electronic devices, at least one process organizer, at least one module developer, at least one task performer and a workflow server. The process organizer generates an application. The process organizer can request modules from module developers that are incorporated into the application. Alternatively, the process organizer makes an agreement with a task performer to perform tasks to complete the application. The application is transmitted to the workflow server, which includes an online marketplace for displaying and selling the applications. A user purchases the application through the store. A routing module generates a signature and compares the signature to application, module or document metadata and a secret to determine consistency of the data before the application, module or document is routed.

20 Claims, 13 Drawing Sheets

CREATION OF SIGNATURES FOR AUTHENTICATING APPLICATIONS

BACKGROUND OF THE INVENTION

1. Field of the Invention

The present embodiment of invention relates to generating and modifying applications, modules and documents. In particular the present invention relates to generating signatures each time a document is transferred between entities and a system for authenticating the signature before delivering the document.

2. Description of the Background Art

The use of portable computing devices has become commonplace for many users. In addition to having a conventional desktop computer, many users also have some type of portable computing device. Examples of present-day portable computing devices include electronic devices for reading such as the Reader from Sony Corp., the Kindle from Amazon, and the Nook from Barnes & Noble. Smaller portable computing devices include a plethora of smart phones including the iPhone from Apple Computer Inc., the Blackberry from Research In Motion and the Pre from Palm just to name a few. There have also been increased sales of notebook laptops and tablet computers offering different levels of processing capability and size.

Users frequently download applications to the portable computing devices for entertainment or business purposes. For example, a process organizer such as a value added reseller creates an application for a doctor to input data into a patient's medical form. The process organizer enlists module developers to perform various activities on the document, such as transcribing audio that is attached to the document or perform handwriting analysis when a doctor handwrites notes onto the document. Once the document is complete, the process organizer uploads the document to a store where an administrator can purchase the document.

One particular problem with this setup is that because the document is transmitted to at least one process organizer and multiple module developers or task performers, there are several opportunities for malfeasance. The process organizer, module developer or task performer could be unauthorized, the document could be intercepted by other parties, etc. This is problematic because a business's ability to thrive is dependent on keeping customer information secure. Thus there is a need to ensure that the document is securely passed between parties.

SUMMARY OF THE INVENTION

The present embodiment of invention overcomes the deficiencies and limitations of the prior art by providing a method and system for creating signatures for authenticating applications. In one embodiment, the system of the present embodiment of invention includes a plurality of portable electronic devices, at least one process organizer, at least one module developer, at least one task performer and a workflow server. The process organizer generates an application. The process organizer requests modules that are incorporated into the application. Alternatively, the process organizer makes an agreement with a task performer to perform tasks to complete the application. This is particularly helpful when the process organizer is good at creating an overall structure of the document but lacks knowledge of specialized areas such as transcription, handwriting recognition, etc. The application is transmitted to the workflow server, which includes an online marketplace module for displaying and selling the applications. A user purchases the application through the store.

In one embodiment, the system also includes an administrator that requests and purchases customized documents for use on the portable computing devices. The administrator can contact a process organizer and request an application for generating a customized document. For example, a company that ships packages may want a particular user interface or specialized functions. The process organizer creates the application and uploads it to the store. The administrator purchases the application and transmits it to various employees that use the document on a portable computing device.

The portable computing devices, the process organizer, the task performers and the module developers are computing devices that each contain a logging module. When one of the computing devices receives an application, module or document and performs actions, the logging unit generates a hash of actions associated with the application as metadata. When a computing device transmits an application, module or document, the workflow server authenticates the application, module or document and routes it to the destination. The workflow server authenticates the application, module or document by generating a signature and comparing the signature to the metadata and secret of the application, module or document. If the comparison is consistent, the application, module or document is routed to its next destination. If the comparison is inconsistent, the last computing device to transmit the application, module or document to the workflow server and/or the destination computing device is notified of an error.

The present embodiment of invention also includes a number of novel methods including a method for routing documents and verifying the authenticity of the documents. In one embodiment, the workflow server receives an application, module or document. The workflow server retrieves metadata and the secret and computes a hash. The workflow server compares the signature to the metadata, secret and computed hash. If the comparison reveals a conflict, an error message is transmitted. If there is no conflict, the workflow server compares the destination to the destination specified in the metadata. If there is a conflict, an error message is transmitted. If there is no conflict, the workflow server routes the application to its destination.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
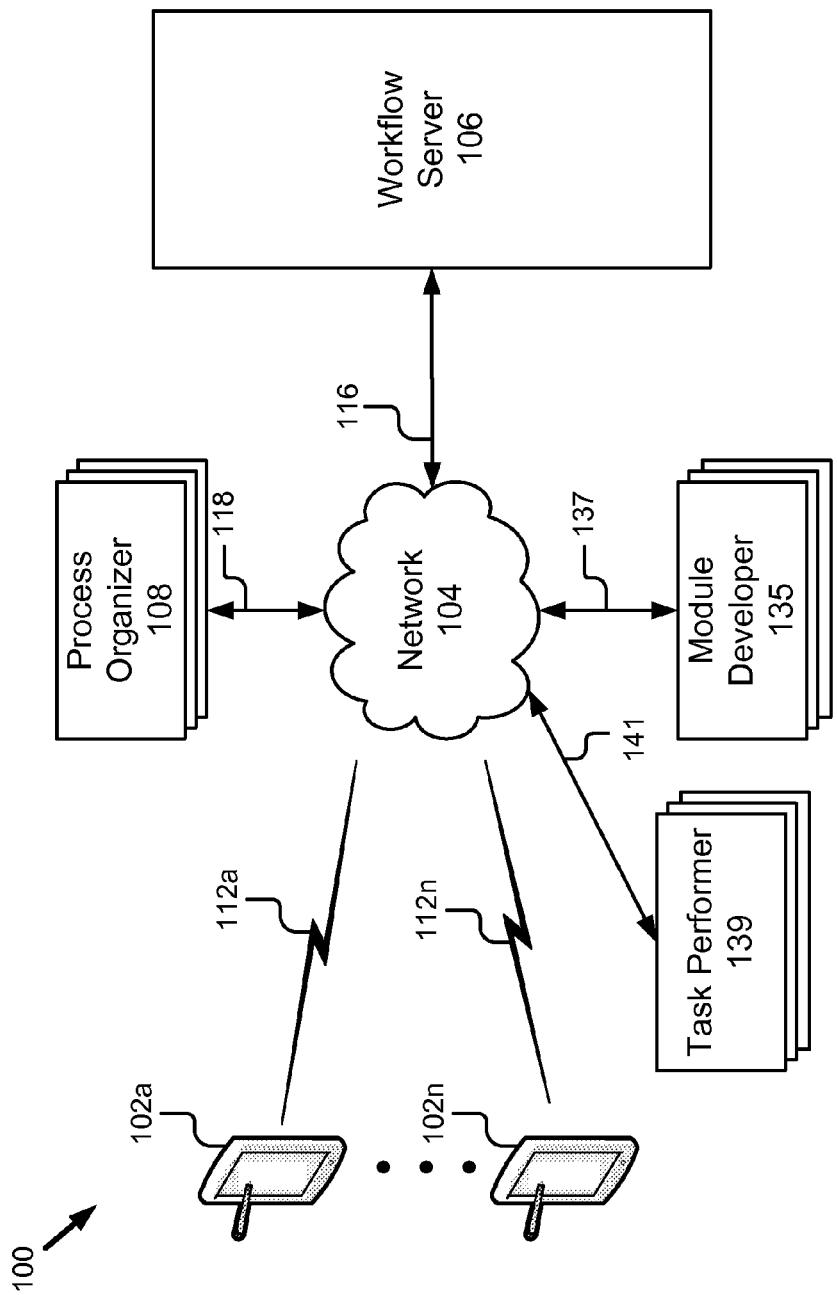
FIG. 1 is a block diagram of an embodiment of a system for routing documents in accordance with the present embodiment of invention.

A system for authenticating and routing applications, modules and documents in a workflow system is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram document in order to avoid obscuring the invention. For example, the present embodiment of invention is described in one embodiment below with reference to portable computing devices that are exemplified in a hardware and software platform like the Amazon Kindle that utilize electronic paper, e-paper or electronic ink display. However, the present embodiment of invention applies to any type of portable computing device that can capture ink, data and commands, and send documents electronically.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. In particular the present embodiment of invention is described below in the content of two distinct architectures and some of the components are operable in both architectures while others are not.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the document of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiment of invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The invention can take the document of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the document of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present embodiment of invention is described with reference to a particular programming language. It will be appreciated that a variety of programming languages may be used to implement the teachings of the invention as described herein.

System Overview

FIG. 1 shows an embodiment of a system 100 for generating and authenticating applications. Referring now to FIG. 1, this embodiment of system 100 comprises: a plurality of portable computing devices 102a-102n, a network 104, a process organizer 108, a module developer 135, a task performer 139 and a workflow server 106.

The plurality of portable computing devices 102a-102n is wirelessly coupled to the network 104 via respective couplings 112a-112n. The portable computing device 102 is coupled to the workflow server 106 and, in one embodiment, the process organizer 108, the task performer 139 and the module developer 135. The portable computing devices 102a-102n include a display, stroke capture capability, audio capture capability, gesture recognition capability and a wireless communication capability. The portable computing devices 102a-102n are adapted to receive images (e.g., documents or forms), add stroke annotations to the received images, and send the annotated received images. Embodiments of the portable computing devices 102a-102n will be described in more detail below with reference to FIG. 2A.

The network 104 is a conventional type, wired or wireless, and may have any number of configurations such as a star configuration, token ring configuration or other configurations known to those skilled in the art. Furthermore, the network 104 may comprise a local area network (LAN), a wide area network (WAN) (e.g., the Internet), and/or any other interconnected data path across which multiple devices may communicate. In yet another embodiment, the network 104 may be a peer-to-peer network. The network 104 may also be coupled to or includes portions of a telecommunications network for sending data in a variety of different communication protocols. In yet another embodiment, the network 104 includes Bluetooth communication networks or a cellular communications network for sending and receiving data such as via short messaging service (SMS), multimedia messaging service (MMS), hypertext transfer protocol (HTTP), direct data connection, WAP, email, etc.

The process organizer 108 is a computing device for generating applications and transmitting the applications to the workflow server 106 using the network 104 via signal line 118. The process organizer 108 is coupled to the workflow server 106, the module developer 135, the task performer 139 and, in one embodiment, the portable computing device 102. The process organizer 108 generates applications that are registered and uploaded to the workflow server 106 and sold in an online marketplace hosted by the workflow server 106. In another embodiment, an administrator (not shown) requests a customized application from the process organizer 108 that is also uploaded and sold in the store.

The process organizer 108 generates applications as a collaborative process. In one embodiment, the process organizer 108 purchases modules from the module developer 135 that are incorporated into the application. In another embodiment, a portable computing device 102 purchases a module via the online marketplace. The module developer 135 is a computing device for generating modules that are incorporated into an application developed by the process organizer 108. The module developer 135 communicates using the network 104 via signal line 137. The module developer 135 is coupled to the process organizer 108, the workflow server 106 and, in one embodiment, the portable computing device 102.

For example, the process organizer 108 generates an application for creating medical forms. The medical form is used in a doctor's office. First the patient inputs personal information onto a computing device 102 using a stylus. The user input is handwritten. As a result, the application includes a module for translating handwriting into text. Next, the doctor attaches his notes, provided verbally to the end of the form. As a result, the application includes a module for translating speech to text. Finally, the doctor's notes include prescriptions for the patient. Once the prescription has been translated, the application needs to include a module for transmitting the prescription to the patient's drug store for filling the prescription.

In another embodiment, the process organizer 108 generates an application for purchase and establishes an agreement with task performers 139 to perform various required tasks. The task performer 139 is a computing device for performing tasks for an application developed by the process organizer 108. The task performer 139 communicates using the network 104 via signal line 141. The task performer 139 is coupled to the process organizer 108, the workflow server 106 and, in one embodiment, the portable computing device 102.

For example, using the medical application example, the process organizer 108 sells an application to a customer via the online marketplace that is hosted by the workflow server 106. The customer transmits from the portable computing device 102a a form to the workflow server 106 with audio to be translated. The workflow server 106 transmits the audio to the task performer 139, which completes the translation and transmits the translation back to the workflow server 106 via signal line 141. The workflow server 106 then transmits the completed form back to the portable computing device 102a.

In one embodiment, users of the portable computing devices 102 purchase applications from the workflow server 106. The applications generate documents that are displayed on the portable computing devices 102. In another embodiment, an administrator (not shown) commissions the process organizer 108 to generate customized applications that are displayed on the portable computing devices 102. For example, the administrator runs a delivery company and requests the process organizer 108 to generate customized applications for tracking the transport and delivery of packages. The portable computing device 102 is used by employees that deliver the packages.

The workflow server 106 is coupled to the network 104 via signal line 116 for communication with the portable computing devices 102a-102n, the process organizer 108, the module developer 135 and the task performer 139. The workflow server 106 includes an online marketplace module 270, a routing module 272 and a registration module 275 (See FIG. 2B). The workflow server 106 maintains an online marketplace module 270 for selling applications to the portable computing devices 102a-102n, uses a registration module 275 for generating unique identifiers and secrets and uses a routing module 272 for verifying the authenticity of applications, modules and documents and routing them to the computing devices in the network 104. The workflow server 106 is described in more detail below with reference to FIGS. 2B, 3A and 4-9.

Although the system of FIG. 1 shows only one workflow server 106, it should be understood that there could be any number of additional workflow servers, for example dedicated to other functions, companies, institutions, organizational structures. A computing device 102a-n may communicate with more than one workflow server 106. Particular pages or sections of a document could be associated with different workflow servers. Also, portions of a compound document can be forwarded rather than sending the entire compound document.

Computing Device 202

Figure 2A:
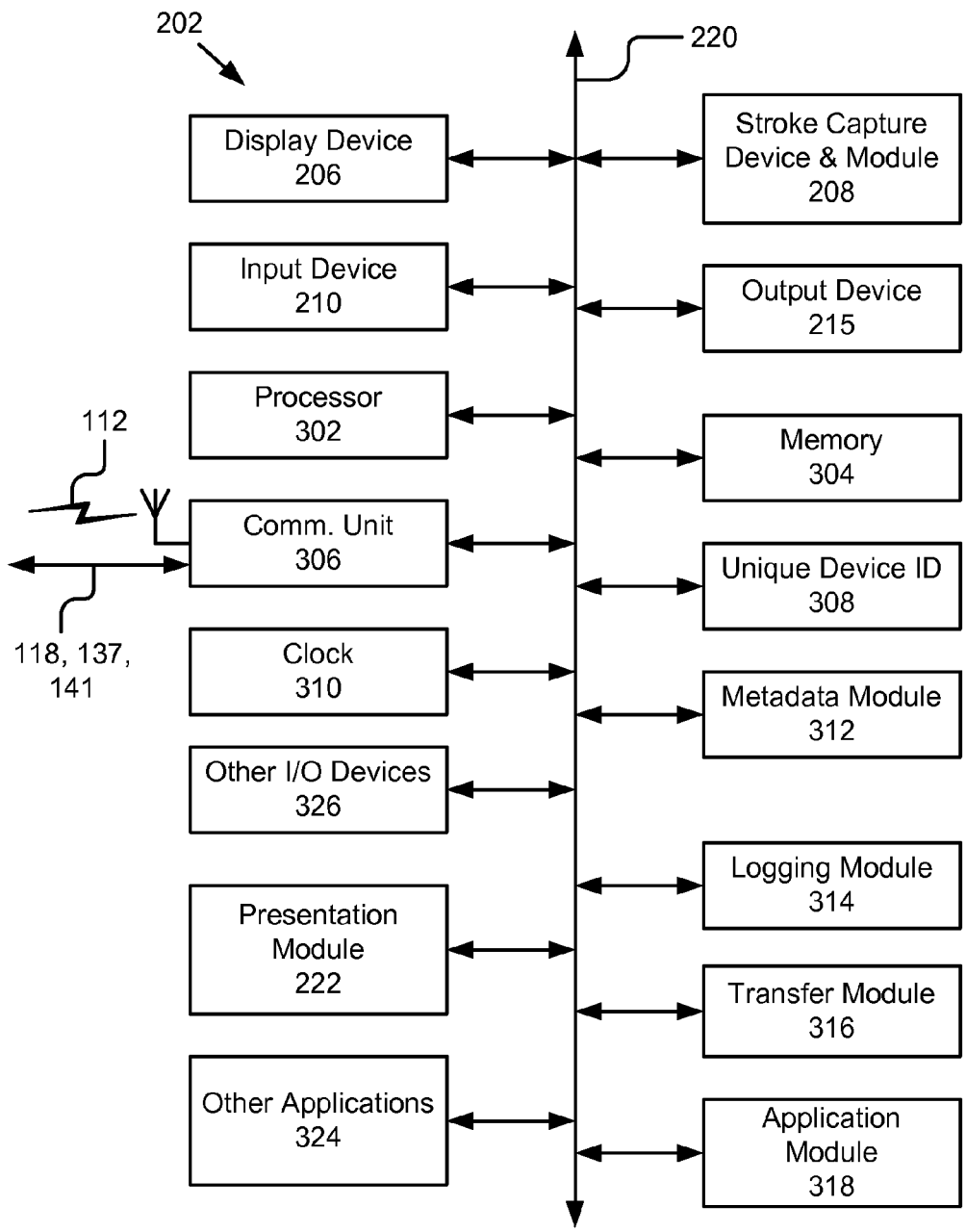
FIG. 2A is a block diagram of an embodiment of a portable computing device, a process organizer, a task performer or a module developer in accordance with the present embodiment of invention.

Referring now to FIG. 2A, the components of a computing device 202 are described. The computing device 202 comprises a display device 206, a stroke capture device and module 208, an input device 210, an output device 215, a processor 302, a memory 304, a communication unit 306, a unique device ID 308, a clock 310, a metadata module 312, other input/output (I/O) devices 326, a logging module 314, an application module 318, a presentation module 222 and a transfer module 316. In one embodiment, the computing device 202 is a portable computing device 102a-n. In another embodiment, the computing device 202 is a process organizer 108. In yet another embodiment, the computing device 202 is a module developer 135. In another embodiment, the computing device 202 is a task performer 139.

The processor 302 comprises an arithmetic logic unit, a microprocessor, a general purpose controller or some other processor array to perform computations, provide electronic display signals to display device 206, and detect and process stroke inputs. The processor 302 is coupled to the bus 220 for communication with the other components of the computing device 202. Processor 302 processes data signals and may comprise various computing architectures including a complex instruction set computer (CISC) architecture, a reduced instruction set computer (RISC) architecture, or an architecture implementing a combination of instruction sets. Although only a single processor is shown in FIG. 3, multiple processors may be included. The processing capability of the computing device 202 may be limited to supporting the display of images and the recording strokes and the transmission of strokes. The processing capability might be enough to perform more complex tasks, including various types of image processing, stroke processing, or recognition tasks. It will be obvious to one skilled in the art that other processors, operating systems, sensors, displays and physical configurations are possible. The computing device 202 also includes an operating system executable by the processor such as but not limited to WINDOWS°, MacOS X, Android, or UNIX® based operating systems.

The memory 304 stores instructions and/or data that may be executed by processor 302. The instructions and/or data may comprise code for performing any and/or all of the techniques described herein. The memory 304 may be a dynamic random access memory (DRAM) device, a static random access memory (SRAM) device, flash memory or some other memory device known in the art. In one embodiment, the memory 304 also includes a non-volatile memory such as a hard disk drive or flash drive for storing log information on a more permanent basis. The memory 304 is coupled by the bus 220 for communication with the other components of the computing device 202.

The communication unit 306 is coupled to an antenna and the bus 220. An alternate embodiment, the communication unit 306 may provide a port for direct physical connection to the network 104. The communication unit 306 includes a transceiver for sending and receiving compound documents. In one embodiment, the communication unit 306 includes a Wi-Fi transceiver for wireless communication with an access point. In another embodiment, the communication unit 306 includes a Bluetooth® transceiver for wireless communication with other devices. In yet another embodiment, the communication unit 306 includes a cellular communications transceiver for sending and receiving data over a cellular communications network such as via short messaging service (SMS), multimedia messaging service (MMS), hypertext transfer protocol (HTTP), direct data connection, WAP, email, etc. In still another embodiment, the communication unit 306 includes ports for wired connectivity such as but not limited to USB, SD, or CAT-5, etc. The communication unit 306 links the processor 302 to the network 104 that may include multiple processing systems. The network of processing systems may comprise a local area network (LAN), a wide area network (WAN) (e.g., the Internet), and/or any other interconnected data path across which multiple devices may communicate. The communication unit 306 also provides other conventional connections to the network 104 for distribution of files (media objects) using standard network protocols such as TCP/IP, HTTP, SSH, git HTTPS and SMTP as will be understood to those skilled in the art.

The computing device 202 includes storage for a unique device identifier 308. The computing device 202 is coupled to the bus 220 to provide the unique identifier to other components as needed. In one embodiment, the storage is read only memory for storing the unique device identifier 308. In another embodiment, the unique device identifier 308 is a nonvolatile storage storing a public key-private key pair. In another embodiment, the public key-private key pair is stored within a specialized trusted computing memory integrated with the CPU or main board of the device. It is useful for the computing device 202 to have a unique identifier that is used to verify the authenticity of the user to ensure that changes made to an application were performed by an authorized entity.

In one embodiment, the unique identifier is the hardware MAC address of a network chip in the computing device 202. The unique identifier 308 may be an internal part of another functional block, such as the communication unit 306, or in nonvolatile storage in memory unit 304. In another embodiment, the unique identifier is a unique ID associated with a memory card on the computing device 202, in that way association with a particular device would move to a different device when the memory card is moved, which might be an expected behavior. Unique identifiers are useful for a variety of operations, but typically do not provide much security. Hardware MAC addresses for example can be imitated by other devices. Thus it is sometimes valuable to have a device associated with a pair of keys from a public key cryptography system, such as RSA®. In one embodiment, the computing device 202 is manufactured with or configured with a private key and the public key disseminated. Then the computing device 202 can use its private key for digital signatures of strokes, images, logs, or other media originating on the device. Others may use the public key to verify such media. The public key may also be used to provide secret communication with the device. Use of the device public key for encryption will limit the access of others to page images or metadata intended solely for a particular computing device 202.

The clock 310 is a conventional type and provides an indication of local time for the computing device 202. In particular, the clock 310 is used to provide a local time at which compound documents are processed. This time value is also stored with data in the local log files using the logging module 314. The clock 310 is adapted to communicate this information to the processor 302 and the logging module 314 using the system bus 220.

The application module 318 is software including routines for generating an application or a module depending upon whether the computing device 202 is the process organizer 108 or the module developer 135. The process organizer 108 includes an application module 318 for generating applications. The module developer includes an application module 318 for generating modules. In one embodiment, the application module 318 is stored in the memory 304 and is accessible and executable by the processor 302.

The metadata module 312 is software including routines for extracting metadata from a document and storing metadata as part of a document. In one embodiment, the metadata module 312 is instructions executable by the processor 302 to provide the functionality described below with reference to FIGS. 7-10 for accessing both image/page metadata as well as document metadata. In one embodiment, the metadata module 312 is stored in the memory 304 and is accessible and executable by the processor 302. In any event, the metadata module 312 is adapted for cooperation and communication with the processor 302 and other components of the computing device 202.

The logging module 314 is software including routines for creating and storing local logs in the memory 304, and more particularly, in a nonvolatile storage portion of the memory 304. In one embodiment, the logging module 314 is a set of routines executable by the processor 302 to store metadata in an entangled log at the computing device 202 and at the workflow server 106. The logging module 314 is particularly critical to provide verification of workflow completion in transactions. In one embodiment, the logging module 314 also includes routines for publishing or storing in a publicly available location on the network the logs of its particular computing device 202. The logging module 314 is coupled by the bus 220 to the processor 302, the memory 304, and the communication unit 306. FIG. 3C below illustrates an example of the type of information that is stored in a log.

The logging module 314 generates a cryptographic hash associated with each log entry hash data including the cryptographic hash of the previous log entry. Storing or publishing the cryptographic hash provides a checksum for all previous entries in the log. Thus if the published hash is "trusted" then it is possible to re-compute all previous log hashes and see if the same final hash results. Changes to any part of the log or any of the data that was hashed to make a log entry can be detected. The format and details for hash computation and verification of such logs and log entries are described in U.S. Pat. No. 7,849,053 filed on Dec. 29, 2005, titled "Coordination and Tracking of Workflows;" U.S. patent Ser. No. 12/244,714, filed on Oct. 2, 2008, titled "Method Apparatus for Tamper Proof Camera Logs;" and U.S. patent application Ser. No. 10/887,998, filed on Jul. 9, 2004 and titled "Synchronizing Distributed Work Through Document Logs," which are each herein incorporated by reference in their entirety.

The cryptographic hashes are also called content based identifiers (CBIs) because they can be used to index data in addition to use for verification. The publication of the most recent cryptographic hash can be to other trusted logs or via email as described in U.S. patent application Ser. No. 12/224,707, filed on Oct. 2, 2008, titled "Method and Apparatus For Risk Analysis of Entangled Logs" and U.S. patent application Ser. No. 12/244,721, filed on Oct. 2, 2008, titled "Method & Apparatus for Automatically Publishing Content Based Identifiers" which are each herein incorporated by reference in their entirety. Thus logs containing cryptographic hashes or CBIs are maintained. The CBI of the recent log entries are stored in other log files and published via email or other protocols. These CBIs can later be used to verify that the log was not modified since the time the CBI was published.

The transfer module 316 is software and routines for transmitting and receiving applications, modules and documents to and from the workflow server 106. In one embodiment, the transfer module 316 transmits applications or modules to the workflow server 106 for display in the online marketplace. In other embodiments, the transfer module 316 sends and receives documents as formatted messages from any other computing device such as but not limited to the computer 108, the workflow server 106 or other portable computing devices 102. The transfer module 316 is coupled by the bus 220 for communication with the processor 302 and the communication unit 306. The transfer module 316 is responsible for transmitting and receiving the application, module, document or formatted message from the computing device 202 such as by email, file transfer, XMPP or special purpose application.

Aligned with the display device 206, there is a stroke capture device 208 such as a digitizing tablet or graphics pad. The stroke capture device 208 is a contact sensing device or a sonic, electromagnetic or light sensing device with receivers that could be above, below, or around the display. The stroke capture device 208 is capable of accepting strokes from the stylus 204 or a finger or other implement. The stroke capture device 208 is a sensor for the stylus 204 and has resolution sufficient to capture recognizable handwriting and printing and other drawings. In one embodiment, display device 206 is equipped with a touch screen in which a touch sensitive, transparent panel covers the screen of display device 206. In one embodiment, the stroke capture device 208 is a digitizer manufactured and sold by Wacom Co., Ltd. In another embodiment, the stroke capture device 208 is simple sensors that return horizontal and vertical position of a single point of contact. In yet another embodiment, the stroke capture device 208 is a plurality of more complex sensors that return an indication of pressure, location, time, and even a stylus 204 ID number or type or indication if a button is pressed on a stylus or the stylus has been inverted, e.g. to erase. Some sensors might return multiple points of contact. Some sensors might be able to distinguish between stylus and finger based touch input. The stroke capture device 208 is either part of or adapted to communicate with the stroke capture module 208.

The bus 220 represents a shared bus for communicating information and data throughout the computing device 202. The bus 220 may represent one or more buses including an industry standard architecture (ISA) bus, a peripheral component interconnect (PCI) bus, a universal serial bus (USB), or some other bus known in the art to provide similar functionality. Additional components coupled to processor 302 through system bus 220 include the display device 206, the stroke capture device and module 208, the input device 210, the output device 215, the processor 302, the memory 304, the communication unit 306, the unique device identifier storage 308, the clock 310, the metadata module 312, the logging module 314, the transfer module 316, the application module 318, the presentation module 222 and the other applications 324. There may also be a plurality of busses in computing system 202, designed to provide the most efficient communications between functional elements.

The presentation module 222 is software and routines for displaying documents on the display device 206, and adjusting the display of the image responsive to input from input device 210. The presentation module 222 performs routines that cause the dual mode user interface described below with reference to FIGS. 5-9 to be displayed. In one embodiment, the presentation module 222 is a thin client routine executable by the processor 302 to cause display of the image on the display device 206. The presentation module 222 is coupled by the bus 220 to the display device 206, the processor 302, and the memory 304.

The other applications 324 include other software and routines executable by the processor 302 for various other types of functionality. In one embodiment, one or more application programs are executed by the processor 302 including, without limitation, word processing applications, electronic mail applications, financial applications, and web browser applications.

Finally, the computing device 202 may include one or more other I/O devices 326. For example, the other I/O devices 326 may include speakers to produce sound, microphones to record sound, a scanner or camera to record documents, images or video, and other sensors or feedback devices like accelerometers, pager motors, or haptic feedback. Optionally, the other I/O devices 326 may include one or more analog-to-digital or digital-to-analog converters, and/or one or more digital signal processors to facilitate audio processing. These other I/O devices 326 are coupled by bus 220 for communication with the processor 302 and the memory 304. Optionally, a microcontroller may be added as part of other I/O Devices 326 to facilitate power systems control, as well as off-load the main processor 302 from lower-speed lesser-important tasks.

Workflow Server 106

Figure 2B:
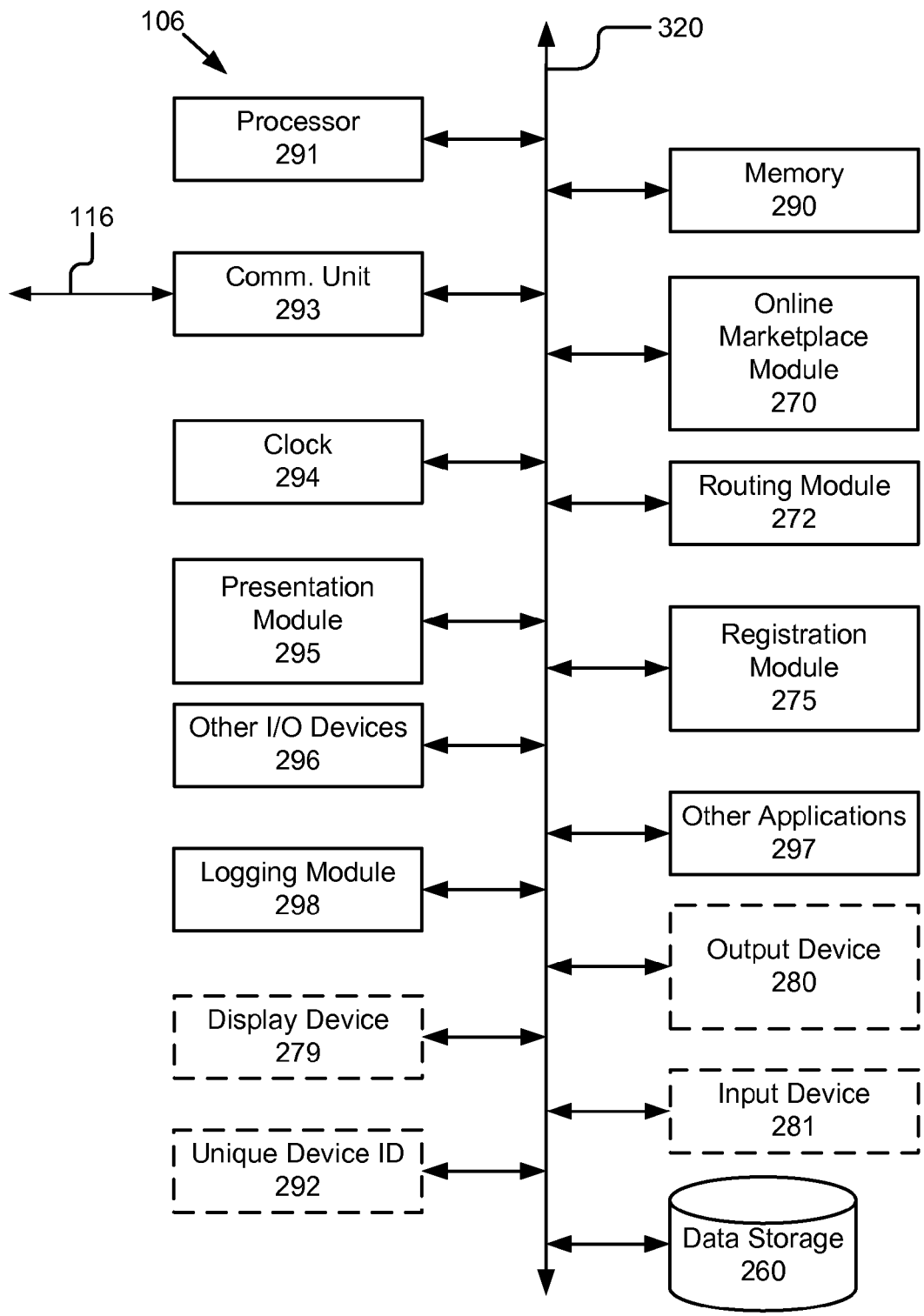
FIG. 2B is a block diagram of a workflow server in accordance with the present embodiment of invention.

Referring now to FIG. 2B, an embodiment of the workflow server 106 will be described in more detail. The workflow server 106 comprises a processor 291, a memory 290, a communication unit 293, an online marketplace module 270, a clock 294, a routing module 272, a presentation module 295, a registration module 275, other input/output devices 296, other applications 297, a logging module 298, a transfer module 299 and data storage 260. In an alternate embodiment, the workflow server 106 further comprises a display device 279, an output device 280, a unique device ID 292 and an input device 281.

Those skilled in the art will recognize that some of the components of the workflow server 106 have the same or similar functionality to the components of the computing device 202 so descriptions of these components will not be repeated here. For example, the processor 291, the memory 290, the communication unit 293, the transfer module 299, the logging module 298, the clock 294, the other applications 297, the display device 279, the output device 280, the unique device ID 292 and input device 281 have a similar functionality to the processor 302, the memory 304, the communication unit 306, the transfer module 316, the logging module 314, the clock 310, the other I/O devices 326, the display device 206, the output device 215, the unique device ID 308 and the input device 210 of FIG. 2A, respectively.

Some differences between the components of the workflow server 106 and the computing device 202 are noted below. For example, the communication unit 293 may couple the workflow server 106 to the network 104 in a wired manner instead of wirelessly. The processor 291 is more computationally powerful than the processor 302 as the workflow server 106 likely services numerous portable computing devices 102. The transfer module 299 is an e-mail server as opposed to an e-mail client. The display device 279 may be a cathode-ray tube, and the output device 280 is a set of speakers. The input device 281 includes a keyboard and mouse type controller. Those skilled in the art will recognize that there may be a variety of other differences as the components of the workflow server 106 acts as a hardware server as opposed to a remote client.

The logging module 298 generates a global log from the logs that are transmitted from the different computing devices. The global log is a central log of all activities that occurred at the different computing devices. The global log includes the hashes from the individual logs but not the details regarding what specifically occurred during each transaction. The specific actions can be recreated by retrieving the metadata associated with the application, document or module.

The registration module 275 is software and routines for generating identifiers and formalizing applications and modules for being uploaded to the online marketplace module 270. In one embodiment, the registration module 275 is a routine executable by the processor 294 to generate identifiers and secret keys as described below with reference to FIGS. 6-8. The application or module is registered and transmitted to the online marketplace module 270 for uploading. The registration module 275 is coupled by the bus 320 to the processor 291, the memory 290 and the online marketplace module 270.

The routing module 272 is software and routines for extracting metadata received with an application, module or document, retrieving the secret from data storage 260, generating a signature, comparing the signature to the application, module or document metadata, generating an error if the comparison yields conflicting data and routing the application to its destination if the signature matches the application, module or document metadata. In one embodiment, the routing module 272 is a routine executable by the processor 291 to cause comparison of the destination to the destination specified in the metadata and routing of the application, module or document to the destination if the comparisons are acceptable. If either of the comparison steps results in conflicting data, an error message is transmitted. The routing module 272 is coupled by the bus 320 to the processor 291 and the memory 290.

The online marketplace module 270 is software and routines for uploading applications, modules and documents to an online store, presenting applications, modules and documents for purchase, billing users that purchase applications and distributing credits to the entities involved in creating the applications upon routing. In one embodiment, the online marketplace module 270 is a routine executable by the processor 291 to bill a user for the initial purchase of an application and a subsequent fee for additional services as a monthly flat fee or per service. The online marketplace module 270 is coupled to the processor 291, the memory 290, the registration module 275 and the routing module 272.

In one embodiment, the data storage 260 is part of the workflow server 106. In an alternate embodiment, data storage 260 is coupled to the workflow server 106. For example, in such an alternate embodiment, the data storage 260 is an online storage service such as Amazon S3. The data storage 260 is a non-volatile memory device or similar permanent storage device and media. Data storage device 260 stores data and instructions for processor 291 and comprises one or more devices including a hard disk drive, a floppy disk drive, a CD-ROM device, a DVD-ROM device, a DVD-RAM device, a DVD-RW device, a flash memory device, or some other mass storage device known in the art. The data storage 260 is used to store the applications and associated metadata including hashes, identifiers, secret keys, signatures, etc. The organization of the data storage 260 is described below in more detail with reference to FIGS. 3A and 3B.

Registration Module 275

Figure 3A:
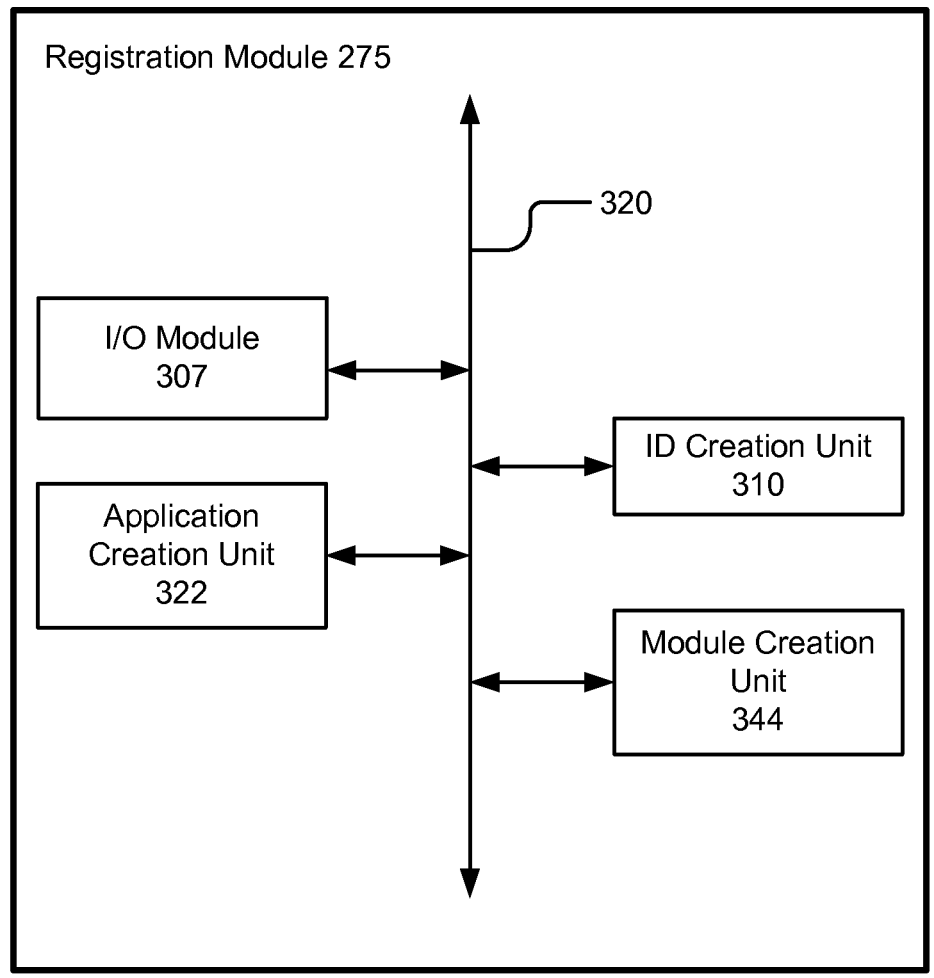
FIG. 3A is a block diagram of an embodiment of the registration module in accordance with the present embodiment of invention.

FIG. 3A illustrates one embodiment for the registration module 275. In one embodiment, the registration module 275 comprises: an input/output module 307, an identification (ID) creation unit 310, an application creation unit 322 and a module creation unit 344 that are each coupled to the bus 320. During registration of an application or a device, the I/O module 307 receives requests for different identifiers and transmits the requests to the ID creation unit 310.

Figure 3B:
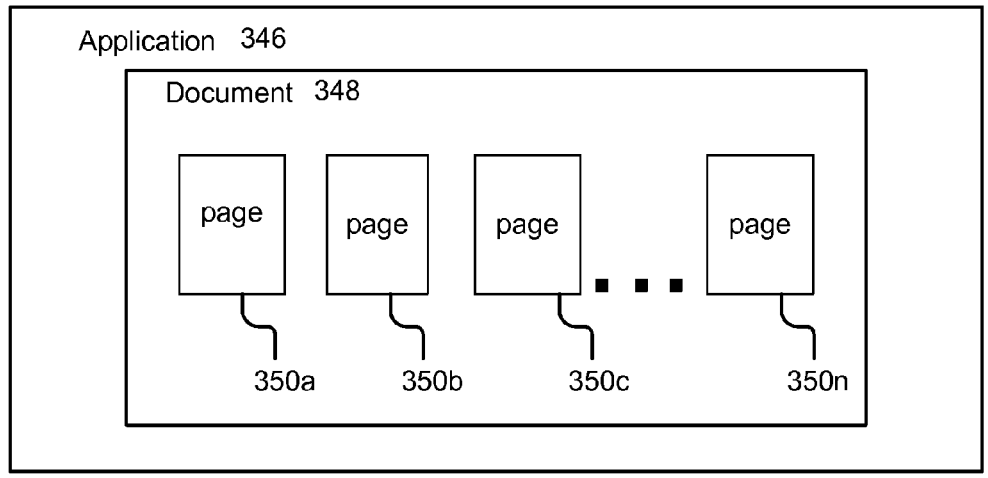
FIG. 3B is a graphical representation of an application containing a document with pages in accordance with the present embodiment of invention.
Figure 3C:
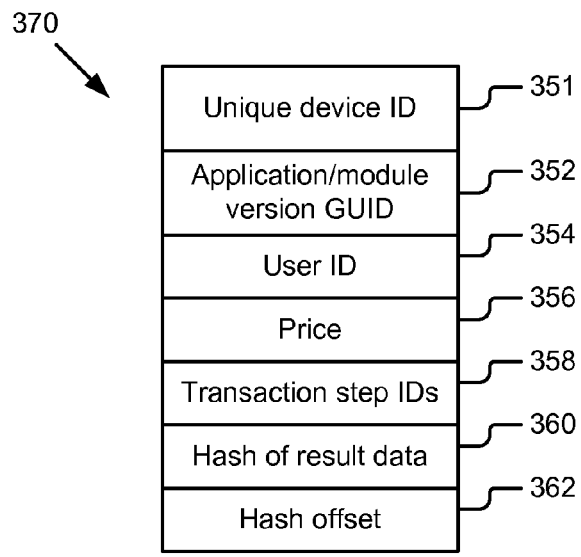
FIG. 3C is a graphical representation of a log entry in accordance with the present embodiment of invention.

To aid in understanding the differences between an application, a document and a module, FIG. 3B illustrates a graphical representation of an application 346. An application 346 may contain software and routines for generating a document 348, or the document may have been generated by other tools associated with that application. An application 346 can incorporate different modules for performing tasks or the modules can be purchased separately.

The document 348 comprises pages 350a, 350b, 350c . . . 350n. In one embodiment, a user purchases an application 346, generates a document 348 and provides information to fill out the pages 350a . . . n. If the application 346 lacks certain functions, the document 348 is transmitted to different task performers 139 made available on the online marketplace module 270 for performing the tasks. The process organizer 108 is typically responsible for setting up the agreement and metadata for transmitting the document 348 to the different task performers 139 for completing the tasks. However, a person of ordinary skill in the art will recognize that other business models are available, such as a customer purchasing additional services from the task performer 139 via the online marketplace module 270. The format and details for billing are described in U.S. application Ser. No. 12/555,686 filed on Sep. 8, 2009, titled "Multi-Provider Forms Processing System with Retry upon Failure," which is herein incorporated by reference in its entirety.

Turning back to FIG. 3A, the ID creation unit 310 includes software and routines for generating identifiers and storing the identifiers in the data storage 260. The ID creation unit 310 is coupled by the bus 320 to the processor 291, the memory 290 and the data storage 260. The ID creation unit 310 generates a globally unique identifier (GUID) for any application or module that is being registered. The GUID is updated each time the application is registered so that the GUID is specific to an application or module version. Thus, the ID creation unit 310 generates an application version GUID.

The ID creation unit 310 also generates a secret for any application or module that is being registered. In one embodiment, the secret is the private key in a public/private key combination. The secret is known to the workflow server 106 and the process organizer 108 or module developer 135. The workflow server 106 stores the secret in the data storage 260 and does not transmit the secret after the initial transmission to ensure that the secret is not intercepted by other parties.

The ID creation unit 310 also generates a unique device ID 351 for any device that is being registered, for example, a portable computing device 102 and a user ID 354 for any entity that makes changes to an application, module or document. The unique device ID 351 ensures that a document being modified by a user on a portable computing device 102 is being modified on an authorized device. The user ID 354 is used to track the computing device that made the changes to more easily identify the source of any problems related to the application, module or document. In one embodiment after the ID creation unit 310 generates the user ID 354, the ID creation unit 310 requests that the user establish an account that includes a home address, credit card information, a billing address, etc. so that the user is properly billed after purchasing or selling an application, module or document. This information is stored in the data storage 260 and is encrypted to protect the user's privacy.

A logging module 314, 298 also saves other information as metadata. FIG. 3C illustrates an example of metadata 370 that is saved in association with the application, document or module. In this example, a unique device ID 351 identifies a computing device 202, such as a portable computing device 102. The application or module version GUID 352 is the identifier for the application being used. The user ID 354 identifies the user of the application, document or module. The price 356 includes the price of the purchased application, the price of any subsequent actions to be performed, etc. The transaction step IDs 358 are used by the workflow server 106 to track which transactions have already been performed and which transactions remain. Each time a transaction is completed a new ID is added to the transaction step IDs 358.

The hash of result data 360 is a hash of the most recent action performed. In one embodiment, the hash of result data 360 is a rolling hash. A rolling hash is a hash of the previous hash and the new data. The hash offset 362 is the difference between the most recent hash and the hash value of the prior log entry. By including information for calculating the hash value of the prior log entry, this information can be used at a later time and examined for verification by comparison with the other entangled logs entries.

The application creation unit 322 is software and routines for transmitting a registered application to the online marketplace module 270. The application creation unit 322 receives the application from the process organizer 108 and the identifiers from the ID creation unit 310. The application creation unit 322 formats the identifiers and application into a format suitable for the online marketplace module 270 and transmits the formatted identifiers and application to the online marketplace module 270. The application creation unit 322 is coupled by the bus 320 to the processor 291 and the memory 290.

The module creation unit 344 is software and routines for transmitting a registered module to the online marketplace module 270. The module creation unit 344 receives the module from the module developer 135 and the identifiers from the ID creation unit 310. The module creation unit 344 formats the identifiers and the application into a format suitable for the online marketplace module 270 and transmits the formatted identifiers and the module to the online marketplace module 270. The module creation unit 344 is coupled by the bus 320 to the processor 291 and the memory 290.

Routing Module 272

Figure 4:
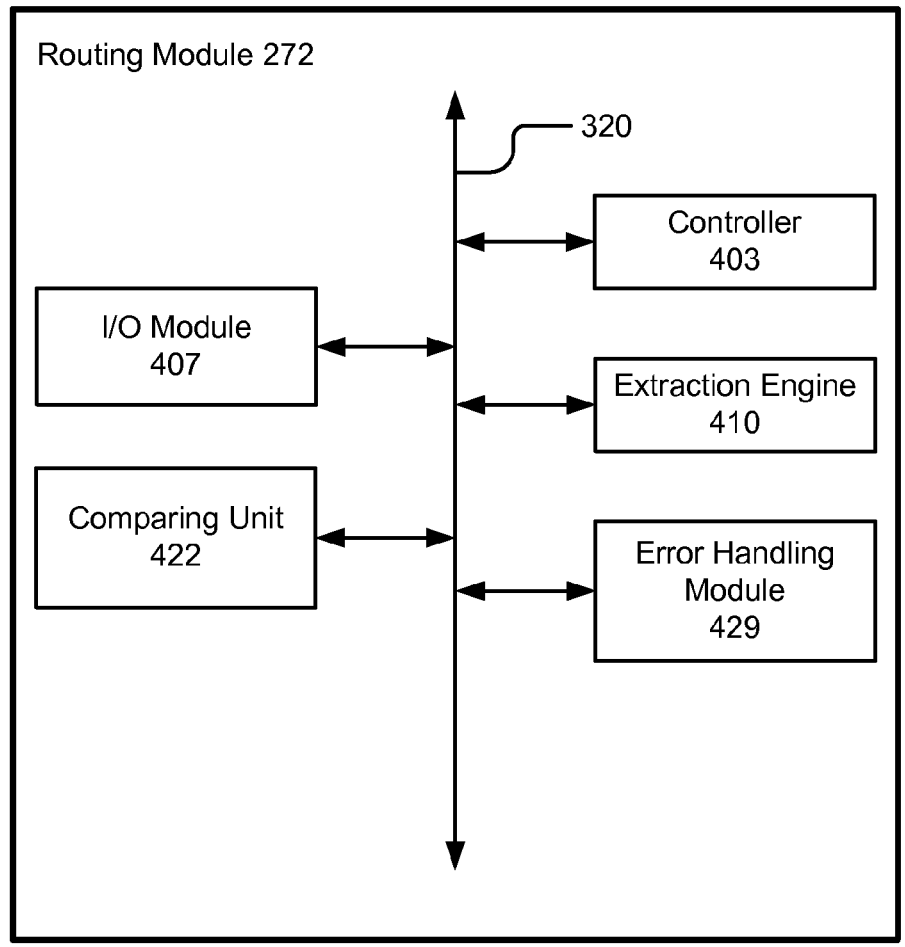
FIG. 4 is a block diagram of an embodiment of the routing module in accordance with the present embodiment of invention.

Turning to FIG. 4, in one embodiment the routing module 272 comprises an I/O module 407, a controller 403, an extraction engine 410, a comparing unit 422 and an error handling module 429 that are coupled to the bus 320 for communication with the processor 291, the memory 290, the online marketplace module 270 and, for the I/O module 407, the communication unit 293.

The I/O module 407 is software and routines for receiving and transmitting applications, modules and documents to their destination. The I/O module 407 receives applications, modules and documents including their metadata 370 from the process organizer 108, the portable computing device 102 and the module developer 135 such as by email, file transfer, XMPP or a special purpose application and transmits it to the controller 403. Once the verification process is complete, the controller 403 transmits via the communication unit 293 the application, module or document to the I/O module 407, which transmits the application, module or document to a portable computing device 102, the process organizer 108, the module developer 135 or the task performer 139 as specified by the transaction step IDs 358.

The controller 403 is software and routines for controlling the verification process of an application, module or document. In one embodiment, the controller 403 is routines executable by the processor 291 to perform verification of an application, module or document by controlling routing between the I/O module 407, the extraction engine 410, the comparing unit 422 and the error handling module 429. The controller 403 also determines where to route the application, module or document by extracting the transaction step IDs 358 and identifying the next step in the routing process.

Once the comparing unit 422 verifies that the application, module or document is authentic, the controller 403 determines the next destination for the document based upon metadata 370 stored inside the document itself, such as based on the transaction step IDs 358. The transaction step IDs 358 specifies additional processing of the document, how the document is to be routed, and the destination for routing. For example, an ordered series of email addresses stored as metadata is one example of a workflow where the document will be passed to each successive email address.

The extraction engine 410 receives the metadata 370 and extracts the application/module version GUID 352, the hash of the result data 360 and the hash offset from the metadata 370. The extraction engine 410 also retrieves the application or module secret from the data storage 260. The extraction engine 410 then hashes the application/module version GUID 352, the hash of result data 360, the hash offset 362 and the secret to form a signature. The signature is transmitted to the comparing unit 422.

When a blank document is created or a document, application or module is modified, the extraction engine 410 generates a signature. For a blank document, the signature is a signed hash of an application secret, a rolling hash and a hash offset. For an application, document or module that has been uploaded to the workflow server 106 and modified, the signature includes a rolling hash, a hash offset, an application version GUID 352 and an application secret. The signature hash is saved as a hash of result data 360 in the metadata 370 associated with the application, document or module and is put back into the log and used by the logging module 314 to generate a rolling hash. Because the application secret is hashed and the hash is generally irreversible, the secret is only known by the workflow server 106 and the process organizer 108 or module developer 135.

The comparing unit 422 is software and routines for comparing the application, module or document's signature with the application, module or document metadata 370 to confirm consistency. If the hashes are inconsistent, the controller 403 instructs the error handling module 429 to generate an error message. If the information is consistent, the comparing unit 422 next compares the destination with the next destination specified by the transaction step 1D 358. If the information conflicts, the error handling module 429 generates an error message. The comparing unit 422 may also test whether the transmitting user continues to have access rights to the application, and if it does not the error handling module 429 generates an error message. If the information is consistent, the I/O module 407 transmits the application, module or document to its next destination.

The error handling module 429 is software and routines for receiving instructions from the controller 403 to notify a portable computing device 102, a process organizer 108, a module developer 135 or a task performer 139 of an inconsistency between the signature and the application, module or document metadata. In one embodiment, the error handling module 429 generates a notification for the last computing device to transmit the application, module or document to the workflow server 106. In another embodiment, the error handling module 429 generates a notification for the portable computing device 102, a process organizer 108, a module developer 135 or a task performer 139 at the intended destination in addition to, or in replace of, the other notification. The error handling module 429 determines where to send the notification by retrieving the information from the transaction step IDs 358.

Online Marketplace Module 270

Figure 5:
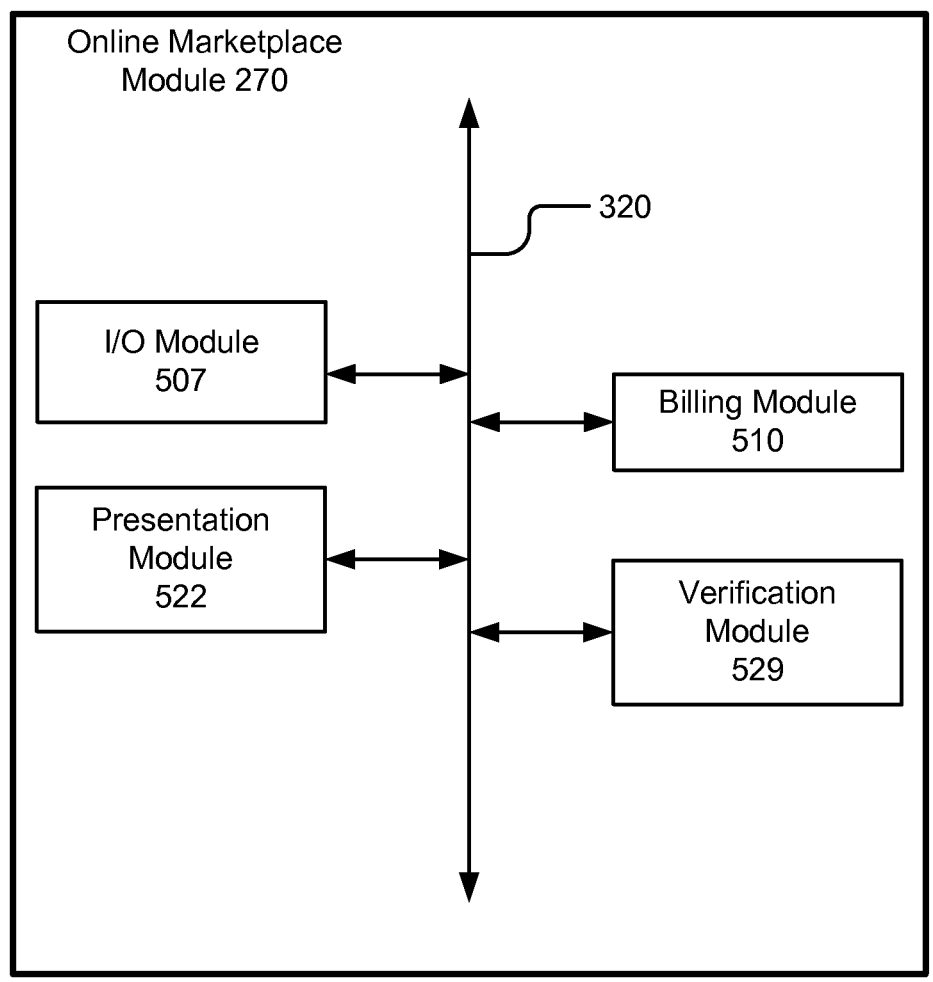
FIG. 5 is an embodiment of the online marketplace module in accordance with the present embodiment of invention.

FIG. 5 is one embodiment of an online marketplace module 270 that comprises: an I/O module 507, a billing module 510, a presentation module 522 and a verification module 529 that are coupled by bus 320 to communicate with the processor 291, the memory 290 and, for the I/O module 507, the communication unit 293.

The billing module 510 is software and routines executable by the processor 291 for billing a requesting party for processing of transactions that have been completed. The transactions include purchasing an application, purchasing a module, performing a task, purchasing a suite of applications and/or modules, etc. In one embodiment, the billing module 510 includes a list of authorized requesting parties, associated portable computing devices 102, identification numbers, billing addresses, payment type and data, and other security and billing information. The billing module 510 also includes similar type information for the process organizer 108, task performer 139 and module developer 135. The billing module 510 transmits an invoice to the requesting party or automatically charges a credit card.

Each step in a paper-like process is considered a transaction. In one embodiment, the prices have been negotiated and set by the process organizer 108, task performer 139, module developer 135 and the workflow server 106. Each of the transactions includes a price for performing the step, a portion of that price that is provided to the task performer 139 and/or module developer 135, and a portion of that price the workflow server 106 retains.

In another embodiment, the billing module 510 dynamically determines the price for a particular transaction based on a number of service providers available on the network, the number of service providers that can perform the transaction, whether this a first attempt at the transaction, the quality of service required for the transaction and various other factors. In such an embodiment, the billing module 510 acts like a market maker to get the transaction completed at the lowest price.

The billing module 510 is coupled to the routing module 272 to determine the status of transactions. Once the transactions have been processed, the billing module 510 accumulates information regarding the requesting party, the entity (the process organizer 108, the task performer 139 or the module developer 135) that performed the transaction step, and other information about the process. The billing module 510 then generates statements of credit or debit for the entity and the requesting parties, respectively.

In one embodiment, the billing module 510 accumulates information for a number of transactions and does not bill the requesting party until the entire series of transactions related to the application, module or document is complete. Such an embodiment requires coordination and communication between the billing module 510 and the routing module 272 so that the billing module 510 knows which transactions are related to the processing of which document, and when all the processing (transactions) for that document have been completed.

In another embodiment, the billing module 510 also generates and processes retractions or credits. Such retractions or credits can be generated long after the requesting party has been billed such as in response to audits of logs, a customer compliant, an identified error or correction, or a discovery that the transaction was poorly, incompletely or inadequately performed. Those skilled in the art will appreciate that a variety of the conventional billing functions can be implemented by the billing module 510 including electronic billing, funds transfer, credit card processing, etc.

In another embodiment, the billing module 510 maintains a list or schedule of billing codes that represent transactions. Each of the billing codes can be used in association with the transaction step IDs 358 to identify the services to be provided and/or completed. In one embodiment, the billing codes have associated parameters for performing the service as well as pre-negotiated prices, and allocations of prices between the entities and the workflow server 106. Those skilled in the art will recognize that such billing codes may include additional information such as bulk discounts or special private pricing agreements. In yet another embodiment, the billing module 510 cooperates with the processor 291 and the communication unit 293 to allow updating and editing of the billing schedule consistent with market conditions and other private agreements.

The presentation module 522 is software and routines for displaying applications, modules and documents in an online marketplace module 270 for purchase. The presentation module 522 generates a user interface for displaying the application, module and document as well as a ratings system, a classification system, a search bar for finding applications, etc. In one embodiment, the presentation module 522 displays both generic applications, such as a medical application for a doctor's office and customized applications, such as a medical application for Dr. Smith.

The customized application can be displayed for everyone to view and only Dr. Smith to purchase. The advantage of displaying the customized application, module or document to everyone is that it showcases the entity's ability to create customized applications. The disadvantage is that a customer may not want their customized application, module or document displayed to other users. Thus, in one embodiment, customized applications, modules or documents are only displayed to everyone after the user has consented.

In another embodiment, customized applications, modules and documents are only displayed to specific users. Because each user is assigned a unique ID 354, the applications, modules and documents are displayed according to the user's unique ID 354. The presentation module 522 also displays processed applications, modules and documents that are specific to the user. For example, the doctor appends a voice recording to a patient form and submits the document for translating the speech to text. The processing is performed by the task performer 139. Once the task performer 139 completes the process, the document is uploaded, authenticated and displayed on the online marketplace module 270 for the doctor to download. This can be in addition or in place of transmitting the processed document directly to the user.

The verification module 529 comprises software and routines for verifying the applications, modules and documents for the online marketplace. In one embodiment, the verification module 529 performs an authentication step similar to the one described above for the comparing unit 422. In another embodiment, the verification module 529 flags applications, modules and documents in response to receiving a low rating or a complaint from a user of a computing device 102, a process organizer 108, a task performer 139 or a module developer 135.

Methods

Referring now to FIGS. 6A-9, the methods of the present embodiment of invention will be described in more detail.

Figure 6A:
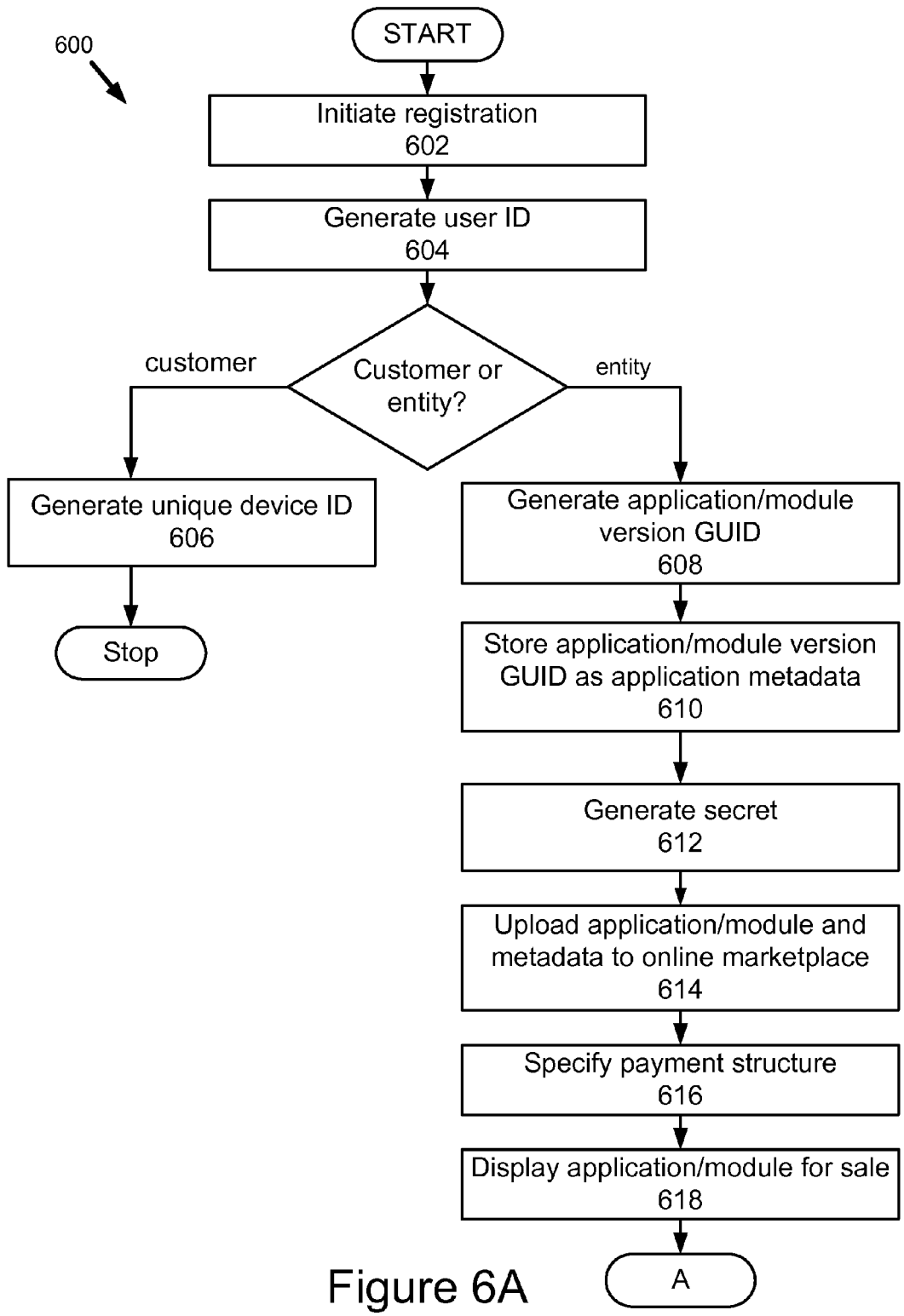
FIG. 6A is a flow diagram illustrating a registration process of the present embodiment of invention for users, applications and modules.

FIG. 6A illustrates one embodiment of a method for registering customers, applications and modules in accordance with the present embodiment of invention. The process begins with a user of a portable computing device 102, a process organizer 108, a task performer 139 or a module developer 135 initiating 602 registration with the registration module 275. In one embodiment, the online marketplace 270 generates a user interface with a login screen for registering users. In one embodiment, the user interface is displayed in a browser. When the login screen is displayed, it includes fields for entry of a password and/or a user name and a selectable button. The user provides the requested information and selects a button to input a username and/or password to the portable computing device 102. The registration module 275 generates 604 a user ID for the user. The user ID is unique to a user and is established, for example, by setting up a username and a password.

The registration module 275 determines whether the user is a customer or an entity. A customer is a user of a portable computing device 102. Responsive to determining that the user is a customer, the registration module 275 generates 606 a unique device ID for the portable computing device. In one embodiment, the unique device ID is associated with the user ID. This is especially important in the event that the unique device ID is reused for other devices due to a lack of unique device ID numbers.

An entity includes a process organizer 108 that generates applications or a module developer 135 that generates a module. Responsive to determining that the user is an entity, the registration module 275 generates 608 an application/module version globally unique identifier (GUID) 352. The GUID is tied to the application or module and includes a version number of the application or module. The version number is used by the routing module 272 to track changes made to different versions of the application or module. The version number is used by the online marketplace 270 to track pricing structures. For example, if a user wants to upgrade from version 1 to version 2, there may be a cost associated with the upgrade because version 2 provides additional functionality. The process organizer 108 or the module developer 135 stores 610 the application or module version GUID 352 as application metadata.

The registration module 275 generates 612 a secret for the application or module and transmits the secret to the process organizer 108 or the module developer 135. In one embodiment the secret is the private part of a public/private key pair. The secret is known only by the process organizer 108 or the module developer 135 and the registration module 275. This reduces the ability of unauthorized entities to intercept the applications and modules and make unauthorized modifications. In one embodiment, the process organizer 108 or the module developer 135 stores the secret, but not as metadata to avoid an unauthorized entity decrypting the metadata. In another embodiment, the secret is generated within the registration module 275 and is not disclosed to the process organizer 108 or module developer 135, but is instead made available to the verification module 529.

Once the GUID and the secret are generated, the application or module is finalized and the application or module and the metadata is uploaded 614 to the online marketplace 270. The online marketplace 270 requests the process organizer 108 or the module developer 135 to specify 616 a payment structure. The payment structure includes a price 356 for purchasing the application and subsequent charges for additional services. For example, in the example above of a form for a doctor's office, the customer initially purchases the form and can elect to pay additional money for translation services. The additional services are billed as a monthly charge or per service. Once the registration process is complete, the online marketplace 270 displays 618 the application or module for sale.

Figure 6B:
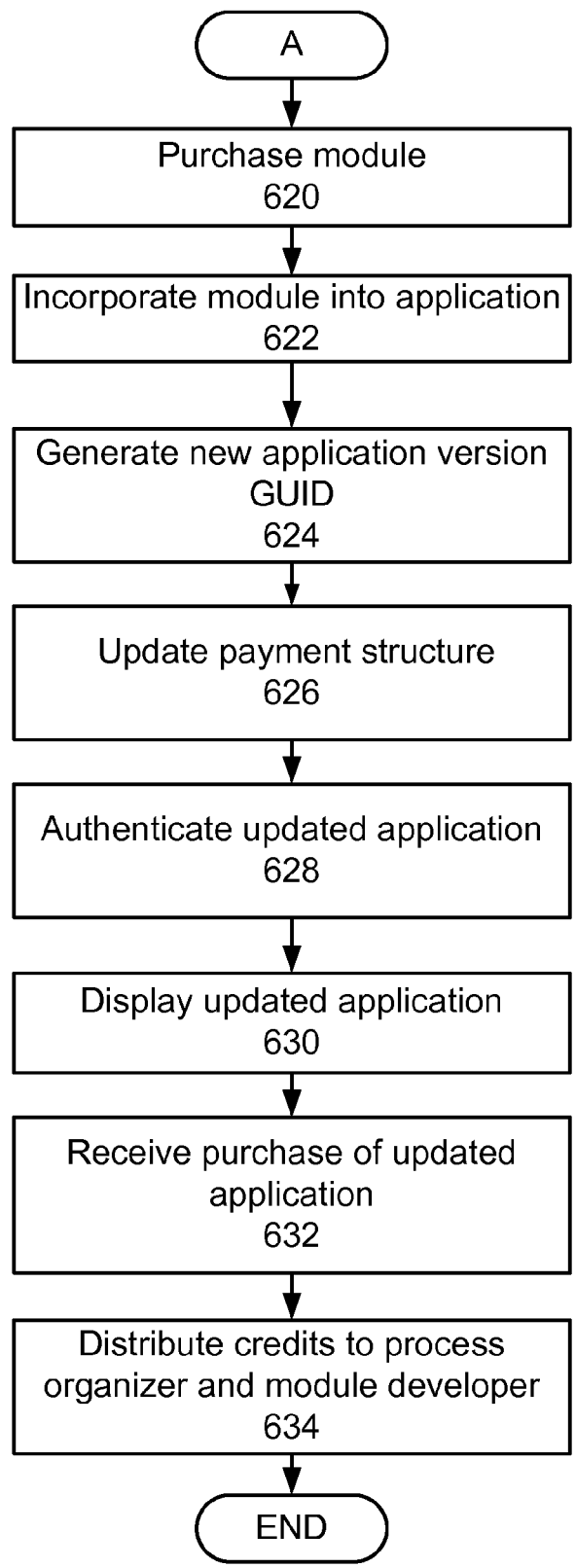
FIG. 6B is a flow diagram illustrating a registration process for an application that incorporates a module from a module developer.

In one embodiment, the modules are purchased by a customer for performing discrete tasks. In another embodiment, the modules are purchased by a process organizer 108 for being incorporated into the process organizer's 108 application. FIG. 6B illustrates steps for incorporating a module into an application and re-registering the application with the registration module 275. In yet another embodiment, the process organizer 108 purchases tasks from a task performer 139. These steps are illustrated in FIG. 6C.

Turning now to FIG. 6B, the process organizer 108 purchases 620 the module from the online marketplace 270. The process organizer 108 incorporates 622 the module into the application. The process organizer 108 re-registers the application by uploading the application to the workflow server 106 or requests a new application version GUID before uploading the application. The registration module 275 generates the new application version GUID 624 and transmits the new application version GUID 624 to the process organizer 108. The online marketplace 270 requests the user to update 626 the payment structure by specifying, for example, what percentage of revenue belongs to the module developer 135 for supplying the module. The routing module 272 authenticates 628 the updated application to ensure that the changes to the application were authorized. The authentication steps are discussed in detail below with reference to FIGS. 7-9. The online marketplace 270 displays 630 the updated application. Once a customer purchases the updated application, the online marketplace 270 receives 632 the purchase of the updated application. The online marketplace 270 distributes 634 the credits to the process organizer 108 and the module developer 135 according to the updated payment structure.

Figure 6C:
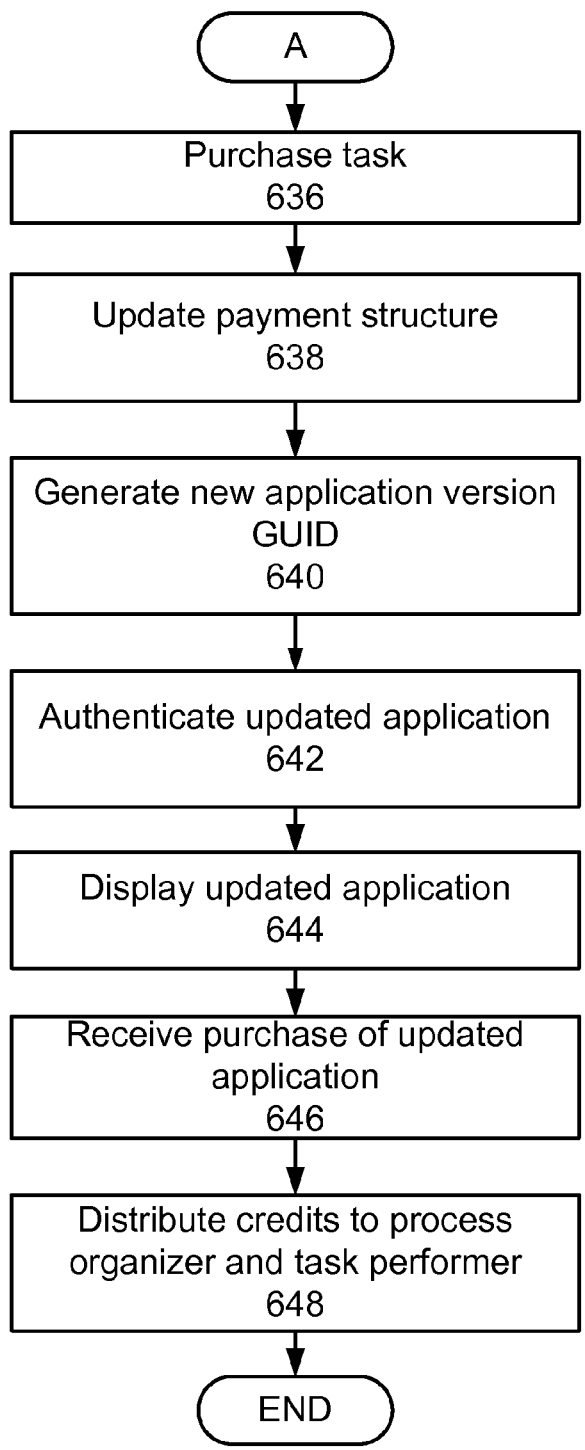
FIG. 6C is a flow diagram illustrating a registration process for an application that purchases a task from a task performer.

FIG. 6C illustrates the steps for purchasing tasks from the task performer 139. The process organizer 108 purchases 636 the task from the task performer 139 and transmits information to the online marketplace 270 so that the online marketplace 270 updates 638 the payment structure associated with the application. In one embodiment, the updated application is uploaded to the workflow server 106 at this time. In another embodiment, the updated application is uploaded after re-registration. The registration module 275 generates 640 a new application version GUID 352. The routing module 272 authenticates 642 the updated application using the processes described with reference to FIGS. 7-9. The online marketplace 270 displays 644 the updated application. Once a customer purchases the updated application, the online marketplace 270 receives 646 a purchase of the updated application and distributes 648 credits to the process organizer 108 and the task performer 139. In one embodiment, the task performer 139 only receives credits upon completion of the agreed upon task being performed.

Figure 7:
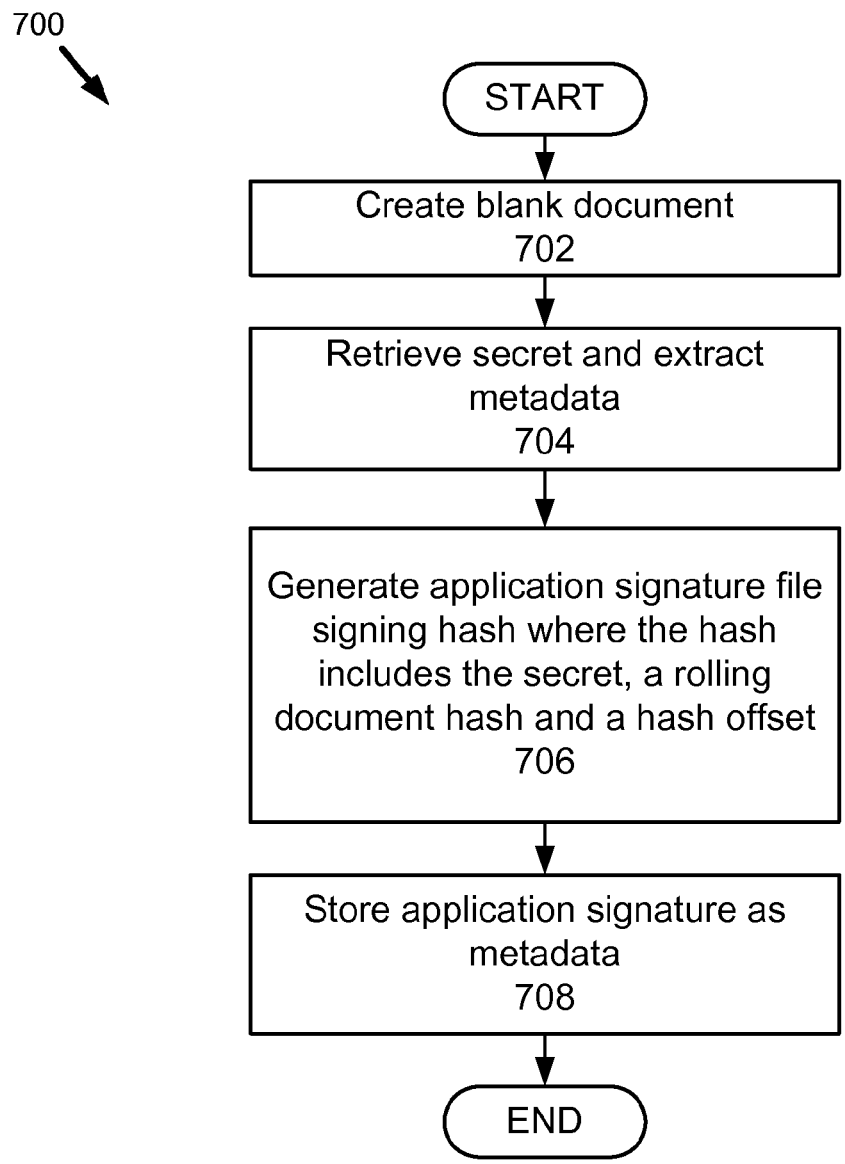
FIG. 7 is a flow diagram illustrating the generation of an application signature in accordance with the present embodiment of invention.

Turning now to FIG. 7, the flow diagram 700 illustrates a process for obtaining an application signature for the application. The process organizer 108 creates 702 a blank document on the workflow server 106. The routing module 272 retrieves 704 the secret from the data storage 260, extracts metadata and generates 706 an application signature file signing hash where the hash combines the secret, a rolling document hash and a hash offset. The registration module 275 stores 708 the application signature as metadata along with the application.

Figure 8:
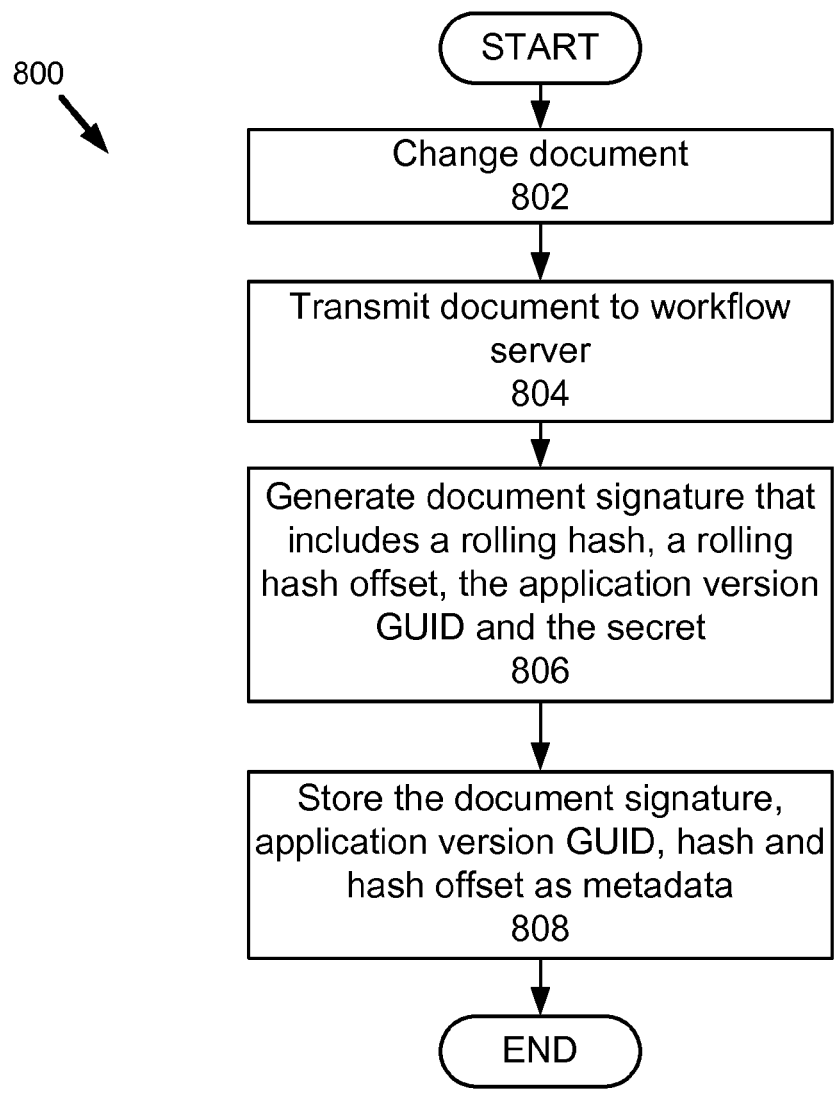
FIG. 8 is a flow diagram illustrating the modification of a document and the generation of a document signature in accordance with the present embodiment of invention.

FIG. 8 is a flow diagram 800 that illustrates the steps for generating a signature after a document has been modified. A user changes 802 the document. For example, a customer inputs information into a form, a process organizer 108 makes a change to the document or a task performer 139 modifies the document by performing a task. The user that made the change to the document transmits 804 the document to the workflow server 106. The routing module 272 generates 806 a document signature that combines a rolling hash, a rolling hash offset, the application version GUID 352 and the secret. This document signature is different from the application signature because it includes the application version GUID 352. The routing module 272 stores 808 the document signature, application version GUID 352, hash and hash offset as metadata along with the modified document. The document and metadata are transmitted to a computing device 202 where the logging module 314 converts the signature into a rolling hash.

Figure 9:
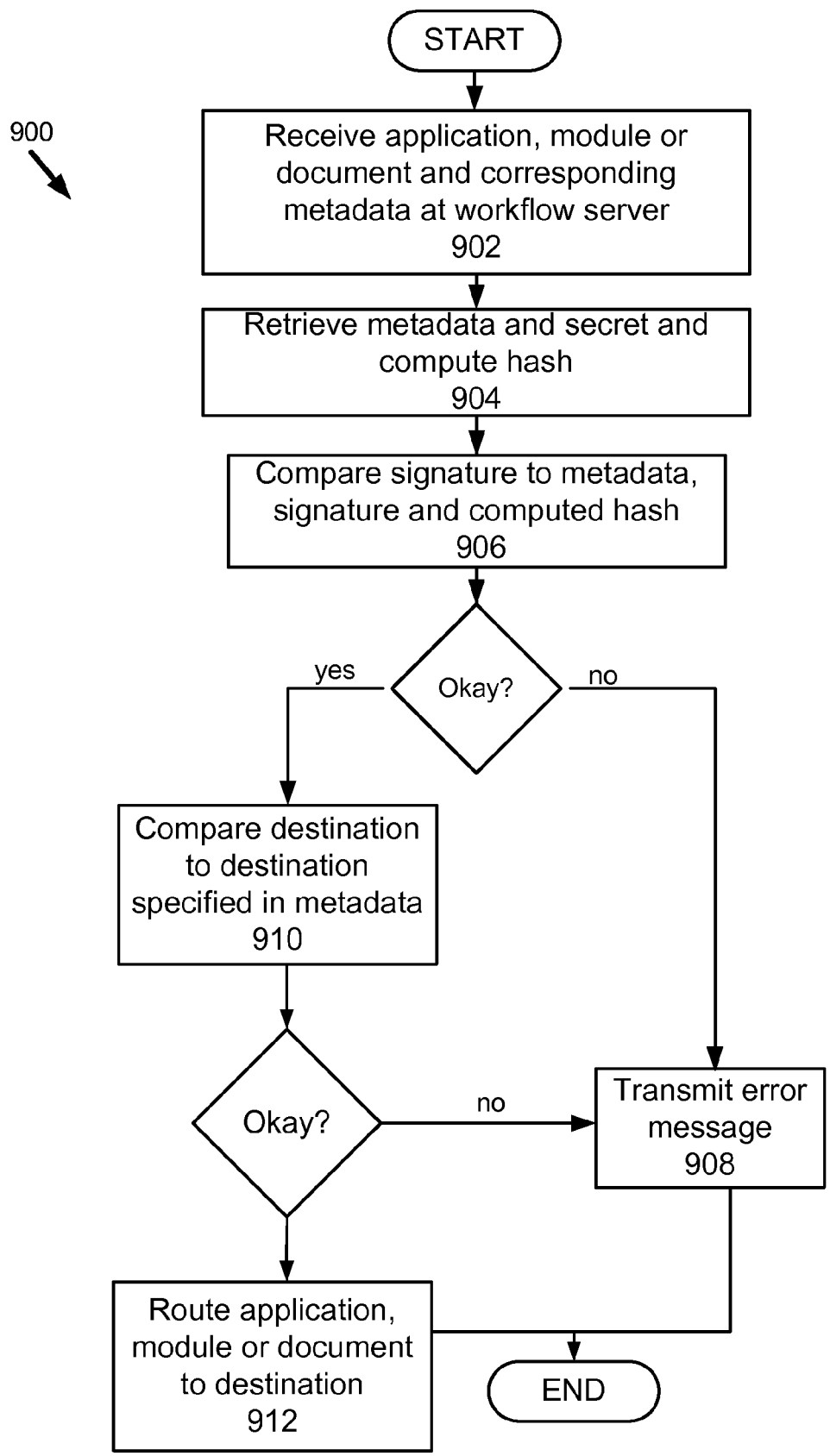
FIG. 9 is a flow diagram illustrating the steps for routing a document in according with the present embodiment of invention.

Turning now to FIG. 9, a flow diagram 900 for routing an application, module or document is illustrated. The workflow server 106 receives 902 an application, module or document. The routing module 272 retrieves 904 metadata and the secret and computes the hash for the document. The metadata includes the information illustrated in FIG. 3C. Specifically, the metadata includes the unique device ID 351, the application version GUID 352, the user ID 354, the price 356, the transaction step IDs 358, a hash of result data 360 and a hash offset 362. The routing module 272 compares 906 the signature to the metadata, signature and computed hash.

The routing module 272 determines whether there is an issue with the comparison. If the data is inconsistent, the routing module 272 transmits 908 an error message. The error message is transmitted to the user that uploaded the data, the user that next receives the document or both. If the data is consistent, the routing module 272 compares 910 the destination to the destination specified in the metadata. The comparison includes checking a list of acceptable destinations to ensure that the destination is on the list, and that the transmitting user has access to at transmission time. If the comparison is problematic, the routing module 272 transmits 908 an error message. If the comparison is acceptable, the routing module 272 routes 912 the application to the destination.

The foregoing description of the embodiments of the present embodiment of invention has been presented for the purposes of illustration and description. It is not intended to be exhaustive or to limit the present embodiment of invention to the precise document disclosed. Many modifications and variations are possible in light of the above teaching. It is intended that the scope of the present embodiment of invention be limited not by this detailed description, but rather by the claims of this application. As will be understood by those familiar with the art, the present embodiment of invention may be embodied in other specific documents without departing from the spirit or essential characteristics thereof. Likewise, the particular naming and division of the modules, routines, features, attributes, methodologies and other aspects are not mandatory or significant, and the mechanisms that implement the present embodiment of invention or its features may have different names, divisions and/or documents. Furthermore, as will be apparent to one of ordinary skill in the relevant art, the modules, routines, features, attributes, methodologies and other aspects of the present embodiment of invention can be implemented as software, hardware, firmware or any combination of the three. Also, wherever a component, an example of which is a module, of the present embodiment of invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present embodiment of invention is in no way limited to implementation in any specific programming language, or for any specific operating system or environment. Accordingly, the disclosure of the present embodiment of invention is intended to be illustrative, but not limiting, of the scope of the present embodiment of invention, which is set forth in the following claims.

The invention claimed is:

1. A computer implemented method for generating a document signature for a document, the method comprising:
   receiving, with one or more processors, a change by an application to the document;
   determining, with the one or more processors, a rolling hash for the document by generating a first hash of a previous hash associated with a previous action performed on the document and a recent action associated with changing the document;
   determining, with the one or more processors, a rolling hash offset for the document by generating a second hash for the recent action associated with changing the document and calculating a difference between the second hash and the previous hash associated with the previous action performed on the document;
   determining, with the one or more processors, a globally unique identifier and a secret associated with the application that changed the document;
   generating, with the one or more processors, a document signature by combining the rolling hash, the rolling hash offset, the globally unique identifier and the secret; and
   storing the document signature, the globally unique identifier, the rolling hash and the rolling hash offset in data storage.

2. The method of claim 1, further comprising generating an application signature for a blank document and transmitting the blank document to a user for the user to change the document.

3. The method of claim 1, further comprising the steps of:
   receiving the document;
   retrieving metadata and the secret;
   computing a signature hash; and
   comparing the signature hash to the metadata and the secret.

4. The method of claim 3, further comprising the steps of:
   detecting a problem by comparing the signature hash to the metadata and the secret; and
   transmitting a first error message.

5. The method of claim 4, further comprising the steps of:
   comparing a destination of the document to a destination specified in the metadata.

6. The method of claim 5, further comprising the steps of:
   detecting a problem by comparing the destination of the document to the destination specified in the metadata; and
   transmitting a second error message.

7. The method of claim 6, wherein the second error message is transmitted to at least one of a process organizer, a customer, a task performer and a module developer.

8. The method of claim 5, further comprising the step of routing the document to the destination specified in the metadata.

9. A computer implemented system for generating a document signature for a document, the system comprising:
   one or more processors;
   a memory storing instructions that when executed by the one or more processors, cause the one or more processors to perform the steps of
   determining, with the one or more processors, a rolling hash for the document by generating a first hash of a previous hash associated with a previous action performed on the document and a recent action associated with changing the document;
   determining, with the one or more processors, a rolling hash offset for the document by generating a second hash for the recent action associated with changing the document and calculating a difference between the second hash and the previous hash associated with the previous action performed on the document;
   determining, with the one or more processors, a globally unique identifier and a secret associated with the application that changed the document;
   generating, with the one or more processors, a document signature by combining the rolling hash, the rolling hash offset, the globally unique identifier and the secret; and
   storing the document signature, the globally unique identifier, the rolling hash and the rolling hash offset in data storage.

10. The system of claim 9, wherein the routing module is further configured to generate an application signature for a blank document and transmit the blank document to a user for the user to change the document.

11. The system of claim 9, wherein the routing module receives the document, retrieves metadata and the secret, computes a signature hash and compares the signature hash to the metadata and the secret.

12. The system of claim 11, wherein the routing module detects a problem by comparing the signature hash to the metadata and the secret and transmits a first error message.

13. The system of claim 12, wherein the routing module compares a destination of the document to a destination specified in the metadata.

14. The system of claim 13, wherein the routing module compares the destination of the document to the destination specified in the metadata and transmits a second error message.

15. The system of claim 14, wherein the routing module transmits the second error message to at least one of a process organizer, a customer, a task performer and a module developer.

16. The system of claim 13, wherein the routing module routes the document to the destination specified in the metadata.

17. A computer program product comprising a non-transitory computer readable medium including a computer readable program, wherein the computer readable program when executed on a computer causes the computer to perform steps comprising:

receiving from a user a change by an application to a document;

determining a rolling hash for the document by generating a first hash of a previous hash associated with a previous action performed on the document and a recent action associated with changing the document;

determining a rolling hash offset for the document by generating a second hash for the recent action associated with changing the document and calculating a difference between the second hash and the previous hash associated with the previous action performed on the document;

determining a globally unique identifier and a secret associated with the application that changed the document;

generating a document signature by combining the rolling hash, the rolling hash offset, the globally unique identifier and the secret; and storing the document signature, the globally unique identifier, the rolling hash and the rolling hash offset in data storage.

18. The computer program product of claim 17, further comprising generating an application signature for a blank document and transmitting the blank document to a user for the user to change the document.

19. The computer program product of claim 17, further comprising the steps of:

receiving the document;

retrieving metadata and the secret;

computing a signature hash; and comparing the signature hash to the metadata and the secret.

20. The computer program product of claim 19, further comprising the steps of:

detecting a problem by comparing the signature hash to the metadata and the secret; and transmitting an error message.

* * * * *